United States Patent
Allen et al.

[11] Patent Number: 5,815,020
[45] Date of Patent: Sep. 29, 1998

[54] BALANCE DIFFERENTIAL RECEIVER

[75] Inventors: Steven Peter Allen, Mesa; William Chunhung Yip, Phoenix, both of Ariz.

[73] Assignee: Motorola, Inc., Schaumburg, Ill.

[21] Appl. No.: 718,733

[22] Filed: Sep. 24, 1996

[51] Int. Cl.$^6$ .................................................. H03H 11/16
[52] U.S. Cl. .......................... 327/255; 327/238; 327/409; 327/99
[58] Field of Search ................. 327/1–12, 254, 327/255, 407, 238, 99, 298

[56] References Cited

U.S. PATENT DOCUMENTS

| | | | |
|---|---|---|---|
| 3,914,762 | 10/1975 | Klensch | 343/6.5 |
| 4,151,405 | 4/1979 | Peterson | 235/382 |
| 4,158,434 | 6/1979 | Peterson | 235/382 |
| 4,587,413 | 5/1986 | Hoppe et al. | 235/492 |
| 4,692,604 | 9/1987 | Billings | 235/493 |
| 4,720,626 | 1/1988 | Nishikawa et al. | 235/449 |
| 4,791,285 | 12/1988 | Ohki | 235/449 |
| 4,802,080 | 1/1989 | Bossi et al. | 363/75 |
| 4,803,350 | 2/1989 | Izawa et al. | 235/492 |
| 4,814,595 | 3/1989 | Gilboa | 235/492 |
| 4,825,056 | 4/1989 | Ohta et al. | 235/449 |
| 4,910,394 | 3/1990 | Ohta | 235/492 |
| 4,942,534 | 7/1990 | Yokoyama et al. | 364/468 |
| 4,960,983 | 10/1990 | Inoue | 235/449 |
| 4,962,485 | 10/1990 | Kato et al. | 365/229 |
| 5,055,659 | 10/1991 | Hendrick et al. | 235/439 |
| 5,068,521 | 11/1991 | Yamaguchi | 235/492 |
| 5,081,458 | 1/1992 | Meunier | 342/44 |
| 5,083,013 | 1/1992 | Levionnais | 235/449 |
| 5,111,455 | 5/1992 | Negus | 327/407 |
| 5,113,184 | 5/1992 | Katayama | 340/825.54 |
| 5,130,522 | 7/1992 | Yamanouchi et al. | 235/492 |
| 5,153,583 | 10/1992 | Murdoch | 340/825.54 |
| 5,157,247 | 10/1992 | Takahira | 235/382 |
| 5,175,418 | 12/1992 | Tanaka | 235/439 |
| 5,182,442 | 1/1993 | Takahira | 235/492 |
| 5,184,001 | 2/1993 | Levionnais | 235/449 |
| 5,191,192 | 3/1993 | Takahira et al. | 235/375 |
| 5,191,608 | 3/1993 | Geronimi | 380/4 |
| 5,198,647 | 3/1993 | Mizuta | 235/449 |
| 5,202,838 | 4/1993 | Inoue | 364/480 |
| 5,206,495 | 4/1993 | Kreft | 235/492 |
| 5,212,373 | 5/1993 | Fujioka et al. | 235/492 |
| 5,218,189 | 6/1993 | Hutchison | 235/439 |
| 5,220,158 | 6/1993 | Takahira et al. | 235/492 |
| 5,225,667 | 7/1993 | Furuta et al. | 235/492 |
| 5,226,167 | 7/1993 | Yamaguchi | 395/800 |
| 5,229,652 | 7/1993 | Hough | 307/104 |
| 5,241,160 | 8/1993 | Bashan et al. | 235/380 |
| 5,241,161 | 8/1993 | Zuta | 235/382 |
| 5,285,370 | 2/1994 | Axer et al. | 363/59 |
| 5,286,955 | 2/1994 | Klosa | 235/380 |
| 5,308,968 | 5/1994 | Yamaguchi | 235/492 |
| 5,313,211 | 5/1994 | Tokuda et al. | 342/50 |
| 5,321,240 | 6/1994 | Takahira | 235/380 |
| 5,326,965 | 7/1994 | Inoue | 235/492 |
| 5,329,529 | 7/1994 | Murphy et al. | 327/407 |
| 5,337,063 | 8/1994 | Takahira | 343/741 |
| 5,345,231 | 9/1994 | Koo et al. | 340/870.31 |
| 5,357,091 | 10/1994 | Ozawa et al. | 235/380 |
| 5,362,954 | 11/1994 | Komatsu | 235/492 |
| 5,376,778 | 12/1994 | Kreft | 235/382 |
| 5,378,887 | 1/1995 | Kobayashi | 235/492 |
| 5,382,778 | 1/1995 | Takahira et al. | 235/380 |

(List continued on next page.)

*Primary Examiner*—Kenneth B. Wells
*Attorney, Agent, or Firm*—James A. Coffing; Michael K. Lindsey

[57] ABSTRACT

A quadrant detector circuit (400) has a comparator (442) having a pair of inputs (438, 440). A first (438) of the pair of inputs (438, 440) is coupled to an in-phase signal (434) and a second (440) of the pair of inputs (438, 440) is coupled to a quadrature phase signal (436). A sample counter (448) has a reset (446) coupled to an output (444) of the comparator (442). A controllable switch (456) has a selection input (454) coupled to an output (452) of the sample counter (448). The controllable switch (456) is capable of switching between a local oscillator signal (458) and an inverse local oscillator signal (460).

14 Claims, 5 Drawing Sheets

U.S. PATENT DOCUMENTS

| | | | |
|---|---|---|---|
| 5,396,056 | 3/1995 | Yamaguchi | 235/492 |
| 5,396,650 | 3/1995 | Terauchi | 455/38.2 |
| 5,412,192 | 5/1995 | Hoss | 235/380 |
| 5,418,353 | 5/1995 | Katayama et al. | 235/380 |
| 5,418,358 | 5/1995 | Bruhnke et al. | 235/492 |
| 5,424,527 | 6/1995 | Takahira | 235/492 |
| 5,426,667 | 6/1995 | van Zon | 372/219 |
| 5,430,447 | 7/1995 | Meier | 342/51 |
| 5,432,328 | 7/1995 | Yamaguchi | 235/449 |
| 5,434,398 | 7/1995 | Goldberg | 235/380 |
| 5,440,302 | 8/1995 | Irmer et al. | 340/870.31 |
| 5,444,222 | 8/1995 | Inoue | 235/380 |
| 5,449,894 | 9/1995 | Bruhnke et al. | 235/492 |

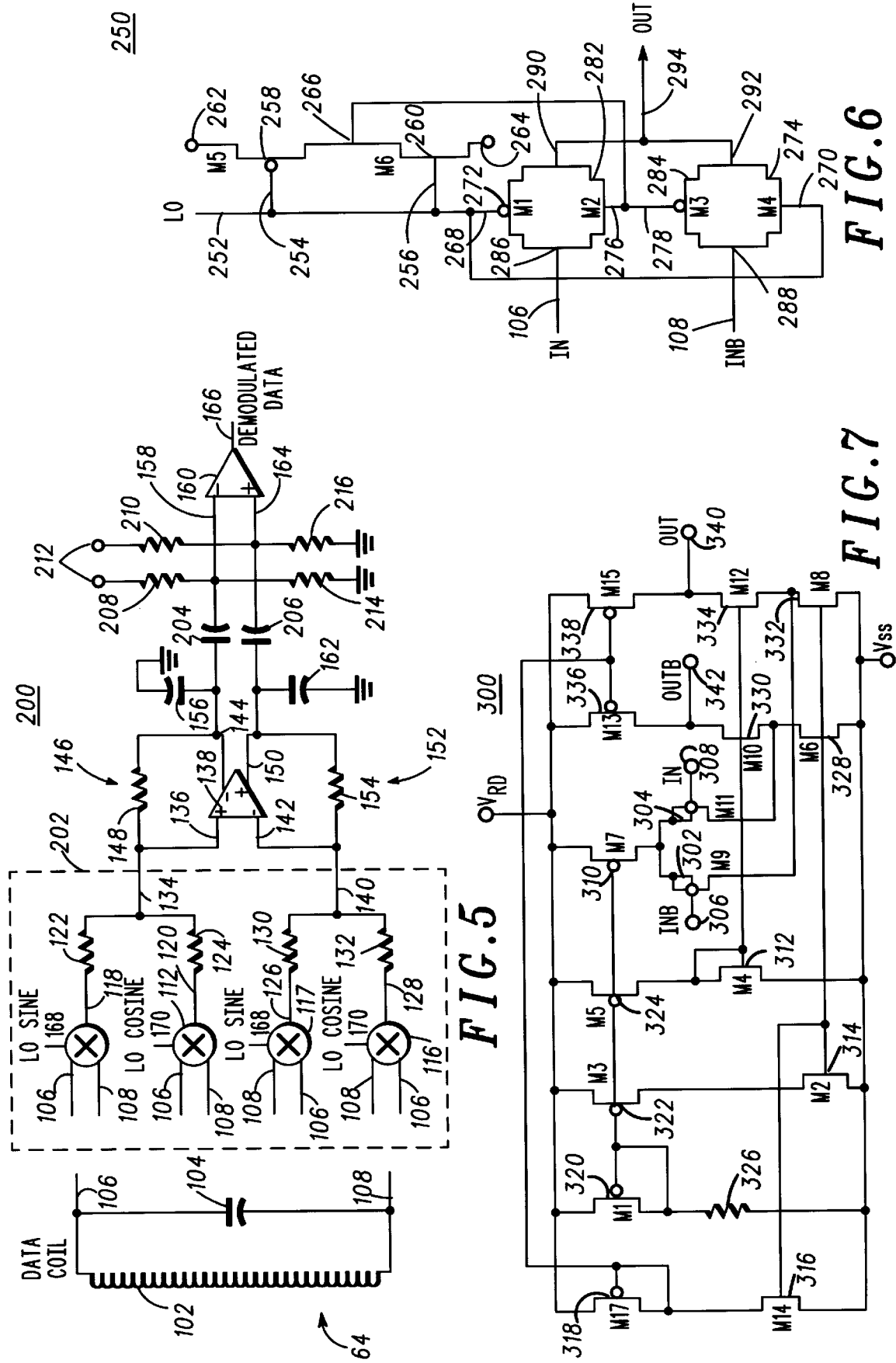

BALANCE DIFFERENTIAL RECEIVER

FIELD OF THE INVENTION

The present invention relates to the field of communication receivers and more particularly to a quadrant detector.

BACKGROUND OF THE INVENTION

Smart cards look and feel much like credit cards but contain a silicon chip for the purpose of communicating, processing and storing sensitive information. Their primary use is for financial transactions in which they hold a monetary balance that is debited with each transaction. In their current configuration metalized tabs are printed on the surface of the card that are directly connected to the imbedded silicon chip. To conduct a transaction the card is inserted into a receptor slot at the reader. Once in the slot, reader probes make contact to the metalized tabs on the card which in turn completes a direct signal and power path from the reader to the chip within the card. Through this direct contact path the card and reader communicate while the reader supplies controlled and filtered power to the card. This arrangement offers ideal conditions for conducting communications to and from the card. However, it has been found that this arrangement gives rise to a multitude of user problems ranging from minor inconveniences to a complete break down of the system. These problems include dirty contacts that result in miscommunication and poor powering of the smart card.

To overcome these problems contact-less smart card have been proposed. Building a high fidelity receiver for the contact-less environment requires a simple receiver circuit. Thus there exists a need for a contact-less smart card, that can provide quality communications.

BRIEF DESCRIPTION OF THE DRAWINGS

FIG. 5 is a schematic diagram of an ASK receiver;

FIG. 6 is a circuit diagram of an embodiment of a mixer used in the receivers of FIGS. 3 and 5;

FIG. 7 is a circuit diagram of an embodiment of a differential operational amplifier used in the receivers of FIGS. 3 and 5;

DETAILED DESCRIPTION OF THE DRAWINGS

A smart card uses one or two coils to receive a power signal and a data signal from a card reader. A power converter coupled to the coil provides power for the smart card long enough to complete a transaction. The power converter also generates a local oscillator signal for the smart card receiver. The receiver can be either an Amplitude Shift Keyed (ASK) receiver or a Bi-Phase Shift Keyed (BPSK) receiver. Either way the receiver is a balanced differential circuit that can be implemented easily in silicon and requires a minimum of current. The balanced differential circuit overcomes the noisy environment of the electrically floating circuit. A processor is coupled to the output of the receiver. The processor keeps the smart card's sensitive data, account balance and processes any transactions. The smart card also has means for transmitting information to the card reader.

Figure 1:
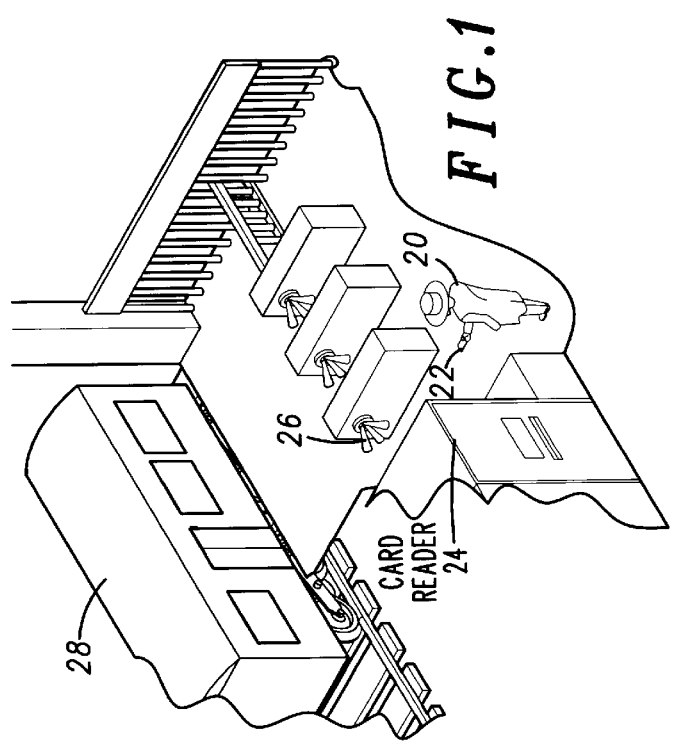
FIG. 1 is a sketch of a smart card system used in a train station.

FIG. 1 is a schematic diagram of a person 20 using the smart card 22 of the invention at a train depot. The person 20 merely waves the smart card 22 near (e.g., 10 to 15 cm) a card reader 24. The card reader 24 deducts the train fare from the smart card 22. The user 20 is then allowed access through a turnstile 26 that is momentarily unlocked. The turnstile 26 provides access to a train 28.

Figure 2:
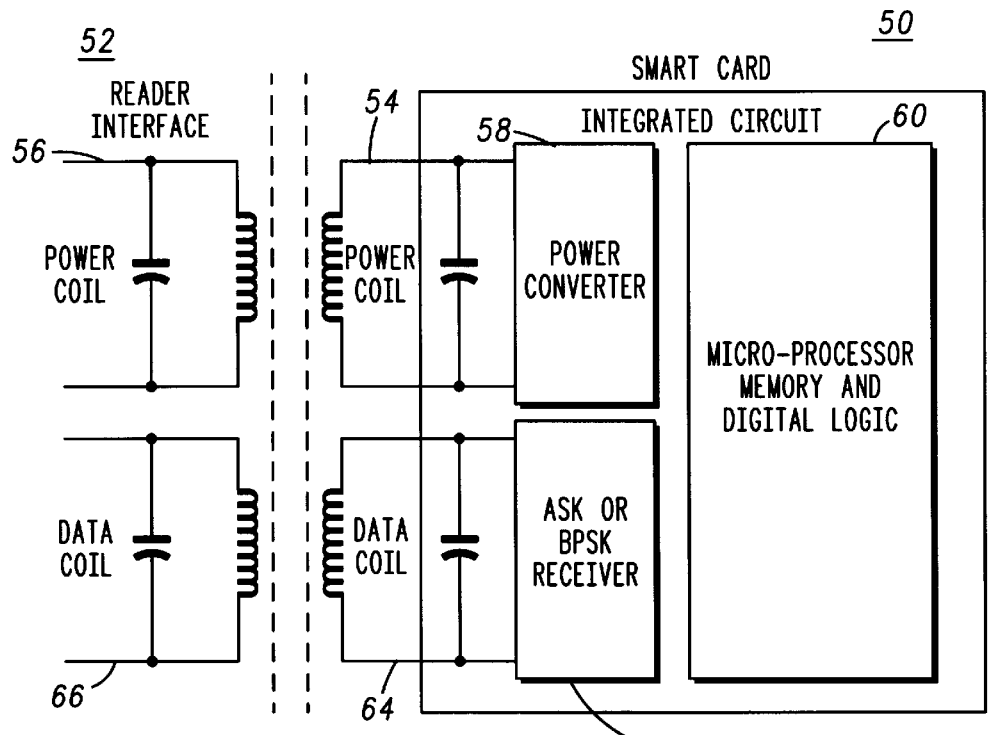
FIG. 2 is a block diagram of a two coil smart card.

FIG. 2 shows a block diagram of a two coil smart card 50 and part of an associated card reader 52. The smart card 50 has a power coil (first coil) 54 that receives a transmitted power signal from a power coil 56 of the reader 52. The power signal is an unmodulated, spectrally pure signal. A power converter 58 receives the transmitted power signal from the power coil and generates a power signal (direct current voltage, voltage power supply signal). The power signal is used to power a processor (microprocessor) 60 and a receiver 62. In one embodiment, the power signal is also used to power a transmitter (not shown) on the smart card 50.

The smart card 50 has a data coil (second coil) 64 that receives a data signal (modulated data signal, radio frequency modulated signal) from a data coil 66 of the reader 52. The data signal can be either an ASK modulated signal or a BPSK modulated signal. The receiver also receives a local oscillator signal that is generated by the power converter 58. The power converter 58 generates the local oscillator signal by converting a portion of the power signal to a local oscillator signal. In the preferred embodiment the power signal is a harmonic of the local oscillator signal and the data signal. Or stated in another way the modulated data signal is a subharmonic of the power signal. The output (a demodulated signal) of the receiver 62 is transmitted to the processor 60 for processing. The receiver 62 is a balance differential circuit.

Figure 3:
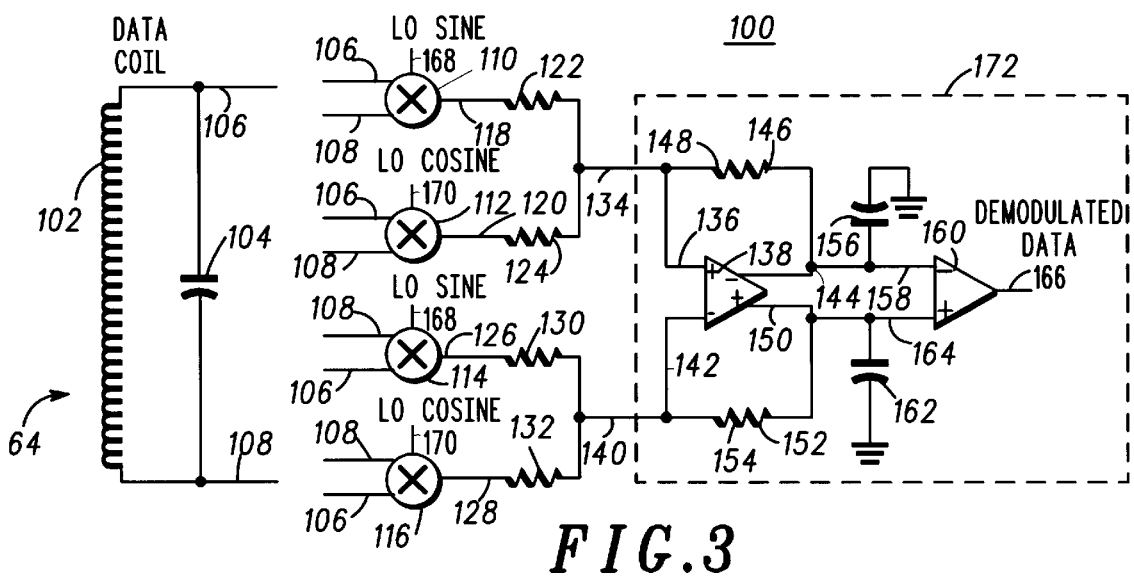
FIG. 3 is a schematic diagram of a BPSK receiver.

FIG. 3 is a schematic diagram of a BPSK receiver 100 used with the smart card 50 of FIG. 2. The balanced differential radio receiver 100 has an antenna (inductive coil) 64 for receiving a radio frequency signal. In one embodiment the antenna 64 is a coil (inductor) 102 in parallel with a capacitor 104. The output 106, 108 of the data coil 64, a first polarity signal 106–108, is coupled to a first in-phase mixer 110 and a first quadrature phase mixer 112 or a first pair of mixers 110, 112. A second polarity signal (inverse output) 108–106 from the data coil (inductive coil) 64 is coupled to an input of a second in-phase mixer 114 and an input of a second quadrature phase mixer 116 or second pair of mixers 114, 116. The first in-phase mixer 110 has a first in-phase signal 118 as its output. The first in-phase signal 118 and a first quadrature phase signal 120 are resistively added in a resistive network 122, 124. A second in-phase signal 126 and a second quadrature phase signal 128 are resistively added in a second resistive network 130, 132.

The output 134 of the first resistive network 122, 124 is a first signal 134 that is connected to a positive input 136 of a differential operational amplifier 138. The output 140 of the second resistive network 130, 132 is a second signal 140 that is connected to a negative input 142 of the differential operational amplifier 138. A negative output 144 of the differential operational amplifier 138 is connected to a feedback circuit 146 that includes a resistor 148 connected to the positive input 136 of the differential operational amplifier 138. Similarly, the positive output 150 of the differential operational amplifier 138 is connected to a feedback circuit 152 that includes a resistor 154 connected to the negative input 142 of the differential operational amplifier 138. The negative output 144 of the amplifier 138 also includes a capacitor 156 connected to ground. The negative output 144 connects to a negative input 158 of a single ended differential amplifier 160. Similarly, the positive output 150 of amplifier 138 is connected to a capacitor 162 that is connected to ground. The positive output 150 is also connected to a positive input 164 of the single ended differential amplifier 160. The output 166 of the single ended amplifier 160 is a demodulated data. The output 166 may need to be inverted before it is passed to the processor. A synchronization word is transmitted first and the output 166 is compared to the known synchronization word and an inverse of the synchronization word. If the output matches the inverted synchronization word, the output 166 is inverted before being transmitted to the processor 60.

The balance differential radio receiver 100 is designed to be able to demodulate the received data signal without knowing the phase relationship between the data signal 106, 108 and a local oscillator signal (in-phase signal, in-phase local oscillator signal) 168. In the preferred embodiment, the local oscillator signal 168 is generated from the power signal received by the power coil 54. The local oscillator signal 168 is generated by dividing the power signal down by a factor of two or four. The co-sine or quadrature phase local oscillator signal (quadrature phase signal) 170 is formed by delaying a portion of the local oscillator signal 168 to form a 90 degree phase shift. Because of the dividing down process and because the data signal does not have to be phase synchronized with power signal at the reader, the phase between the data signal and the power signal is indeterminate. The circuit 100 handles this concern by having both the in-phase mixers 110, 114 and the quadrature phase mixers 112, 116. As a result both of the orthogonal components of the received signal are mixed to baseband. The circuit has four total mixers to maintain a balanced differential configuration. The in-phase mixers output 118 is added to the quadrature phase mixers output 120 to determine the total signal received. This works fine as long as the received signal is in the first or third quadrant with respect to the local oscillator signal 168 and co-sine local oscillator signal 170. However, if the received signal is in the second or forth quadrant, the in-phase signal 118 subtracts from the quadrature phase signal 120. The circuit overcomes this problem by using a quadrant detector circuit. The quadrant detector circuit is explained in more detail with respect to FIG. 9.

Figure 4:
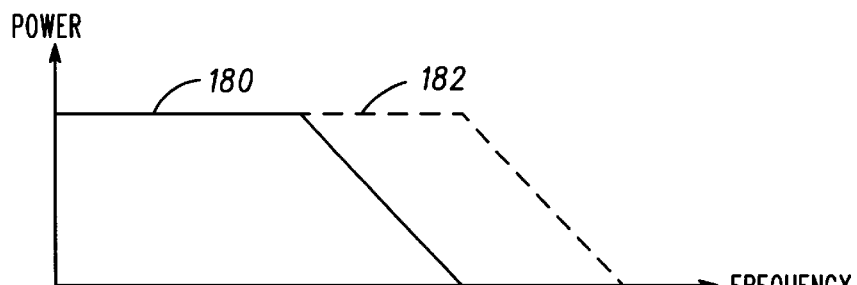
FIG. 4 is a plot of a frequency response of an operational amplifier.

Once the received signal has been mixed to baseband and resistively added it is amplified by a differential amplification circuit 172. The differential amplification circuit 172 amplifies the baseband signals 134, 140 and eliminates the common mode noise picked up by the coil 102. Because the circuit is electrically floating, it picks up a large amount of common mode noise and without the differential design the noise would completely hide the desired signal. The first stage of amplification includes feedback 146, 152. Capacitors 156, 162 are used to eliminate the possibility that the first stage of amplification can begin oscillating. The capacitors 156, 162 attenuate the high frequency amplification of the first stage. The second stage of amplification 160 is open loop and converts the differential signal to an output digital signal level 166 reference to the power supply signal. The amplifiers 138, 160 are purposely current starved (limited, low input current). This saves precious power (current) and has the beneficial effect of filtering the high frequency components (high frequency signals) of the received signal. The high frequency components of the signal are mostly noise. This is shown in more detail in FIG. 4. The figure shows the frequency response of a current limited operational amplifier in a solid line 180 and an operational amplifier under normal operating condition in a dashed line 182. The plot is not to scale and is just representative of the relative performance of the two conditions under which an operational amplifier can be operated.

The balanced part of the differential circuit is maintained by having similar components have the same value. For instance, resistors 122, 124, 130, 132 all have the same value, and resistors 148, 154 have the same value and capacitors 156, 162 have the same value.

FIG. 5 shows a balance differential radio receiver 200 designed to demodulate an ASK modulated signal. The receiver 200 is very similar to the receiver 100 of FIG. 3. The differential mixing section 202 is exactly the same as in the receiver 100. The first stage of amplification, including the amplifier 138, feedback loops 146, 152 and stabilizing capacitors 156, 162 is the same as in receiver 100. However, the negative output 144 of the amplifier 138 is coupled to a blocking capacitor 204 and similarly the positive output 150 is connected to a blocking capacitor 206. The blocking capacitors 204, 206 eliminate any offset voltage (DC component) on the outputs 144, 150. The blocking capacitors 204, 206 are connected to a voltage divider comprising a first resistor 208, 210 connected between the blocking capacitors 204, 206 and the power signal 212. A second resistor 214, 216 is connected between the blocking capacitor 204, 206 and ground. The voltage divider places a bias voltage on the signals coupled to the negative input 158 and the positive input 164 of the single ended operational amplifier 160. The extra circuitry of the receiver 200 assures that the first polarity signal and the second polarity signal are fluctuating about the same reference voltage. This extra circuitry is not required for a BPSK receiver.

FIG. 6 is a circuit diagram of an embodiment of a mixer 250 used in the receivers of FIGS. 3 and 5. The circuit 250 is a fairly standard design for a mixer circuit implemented in silicon. The local oscillator signal 252 is coupled to the gates 254, 256 of an inverter pair of transistors 258, 260. The source 262 of transistor 258 is coupled to the supply voltage ($V_{DD}$) and the source 264 of transistor 260 is coupled to the source voltage. The local oscillator signal 252 is also coupled to gates 268, 270 of transistors 272, 274. The inverted local oscillator signal 266 is coupled to the gates 276, 278 of transistors 282, 284. The output terminal 106 from the data coil 64 is connected to an input 286 of the switch pair of transistors 272, 282 and the output terminal 108 is connected to an input 288 of the switch pair of transistors 274, 284. The outputs 290, 292 of the switch pairs are connected together to form the mixer output 294. When the local oscillator signal and the input signals have the same phase the result is to fully rectify the input signal. For example, when input 106 is negative the local oscillator signal 252 is negative and as a result the transistor 272 is conductive as is transistor 282. When the local oscillator signal 252 is positive, the transistors 274, 284 are conductive.

FIG. 7 is a circuit diagram of an embodiment of a differential operational amplifier 300 used in the receivers of FIGS. 3 and 5. The circuit design is fairly typical for operational amplifiers. A pair of matched transistors 302, 304 have gates 306, 308 that form the negative input 306 and the positive input 308 of the differential operational amplifier 300. The transistor 310 acts as the current source for differential amplifier 302, 304, 310. The circuitry comprising the transistors 312–324 and resistor 326 form voltage references for the cascode pair 328, 330 and cascode pair 332, 334. Transistor 336 acts as a current source for the cascode pair 328, 330 and transistor 338 acts as the current source for the cascode pair 332, 334. The positive output 340 of the circuit 300 is between the transistors 334, 338 and the negative output 342 is between the transistors 330, 336.

Figure 8:
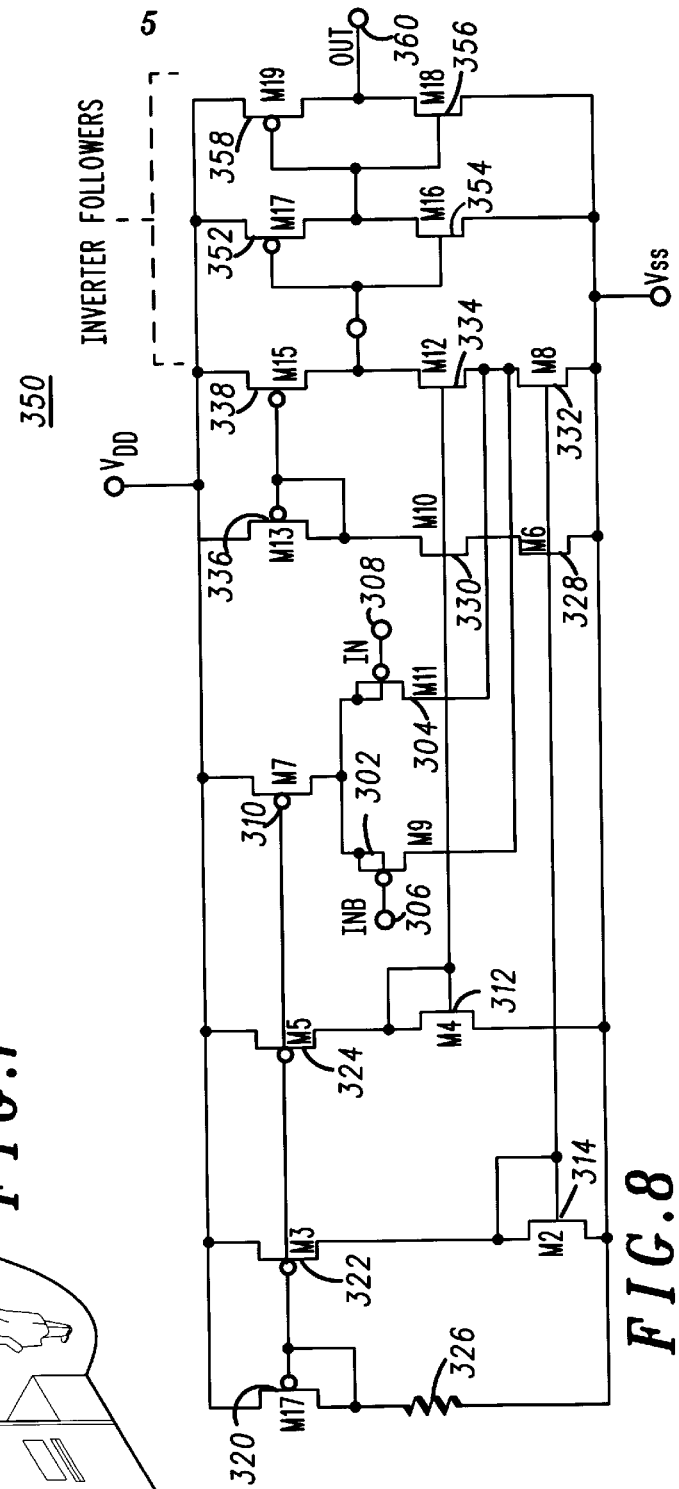
FIG. 8 is a circuit diagram of an embodiment of a single ended operational amplifier used in the receivers of FIGS. 3 and 5.

FIG. 8 is a circuit diagram of an embodiment of a single ended operational amplifier 350 used in the receivers of FIGS. 3 and 5. The single ended operational amplifier is essential the same as the differential operational amplifier 300, except the inverter followers formed by transistors 352–358. The output 360 is between the transistor pair 356, 358. Again this is a fairly typical design for a single ended operational amplifier.

Figure 9:
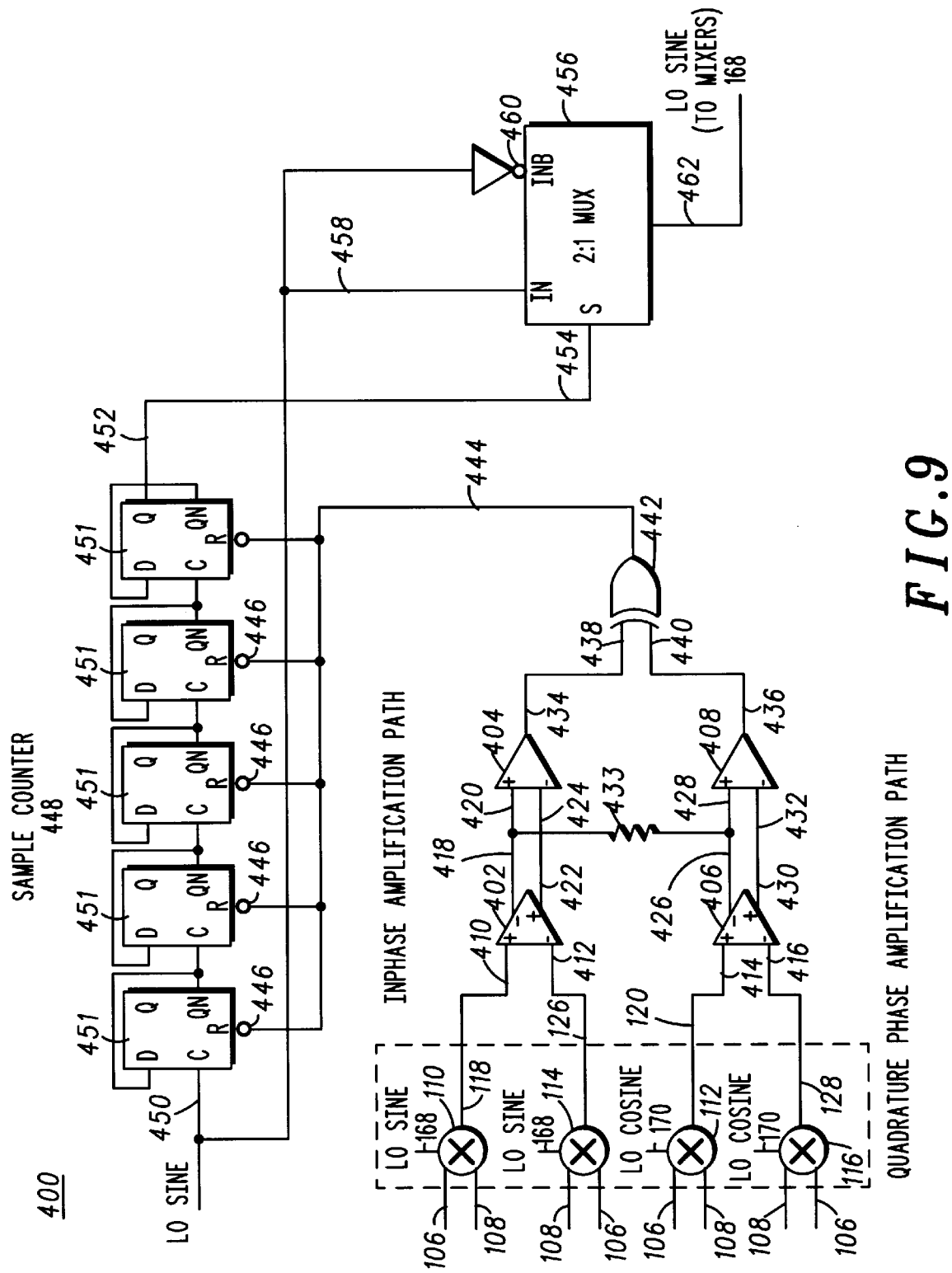
FIG. 9 is a schematic diagram of a quadrant detector circuit.

FIG. 9 is a schematic diagram of a quadrant detector circuit 400. The quadrant detector circuit 400 determines whether an input signal is in a summing quadrant (first or third quadrant) or a subtracting quadrant (second or forth quadrant) relative to a local oscillator signal 168. An amplification stage (amplifier, means for amplifying) has an in-phase differential operational amplifier 402, an in-phase single ended operational amplifier 404, a quadrature phase differential operational amplifier 406, and quadrature phase single ended operational amplifier 408. A positive input 410 of the in-phase differential operational amplifier 402 is connected to the first polarity in-phase signal 118. A negative input 412 of the in-phase differential operational amplifier 402 is connected to the second polarity in-phase signal 126. A positive input 414 of the quadrature phase differential operational amplifier 406 is connected to the first polarity quadrature phase signal 120. A negative input 416 of the quadrature phase differential operational amplifier 406 is connected to the second polarity quadrature phase signal 128.

A negative output 418 of the in-phase differential operational amplifier 402 is connected to a positive input 420 of the in-phase single ended operational amplifier 404. A positive output 422 of the in-phase differential operational amplifier 402 is connected to a negative input 424 of the in-phase single ended operational amplifier 404. A negative output 426 of the quadrature phase differential operational amplifier 406 is connected to a positive input 428 of the quadrature phase single ended operational amplifier 408. A positive output 430 of the quadrature phase differential operational amplifier 406 is connected to a negative input 432 of the quadrature phase single ended operational amplifier 408. A resistor 433 is coupled between the negative output 418 and the negative output 426. The outputs (in-phase signal, quadrature phase signal) 434, 436 of the in-phase and quadrature phase single ended operational amplifiers 404, 408 are coupled to the pair of inputs 438, 440 of a comparator (exclusive OR gate, means for comparing) 442.

An output (indication signal) 444 is connected to a reset 446 of a sample counter 448. An inactive reset signal 444 is transmitted from the comparator when the inputs 438, 440 have an equal polarity and an active reset signal 444 is transmitted when the inputs 438, 440 have an opposite polarity. The sample counter 448 has an input 450 coupled to a local oscillator signal. In one embodiment the local oscillator signal is generated by the power converter. The sample counter comprises a plurality of D flip flops 451. The output of the sample counter 452 is connected to a selection input 454 of a controllable switch (multiplexer, means for selecting) 456. The controllable switch 456 having a first input 458 coupled to the local oscillator signal (first local oscillator signal) 450 and a second input 460 coupled to an inverse local oscillator signal (second local oscillator signal). The controllable switch switching between the first local oscillator signal and the second oscillator signal, when the output 444 transmits the reset signal. The controllable switch 456 having an output 462 connected to an in-phase local oscillator signal 168. Thus the quadrant detector 400 inverts or shifts by 180 degrees the sine local oscillator signal when the comparator has signals of opposite polarity. The resistor 433 keeps the circuit 400 from flipping back and forth when the input signal is in phase with the sine local oscillator signal or the cosine local oscillator signal.

Figure 10:
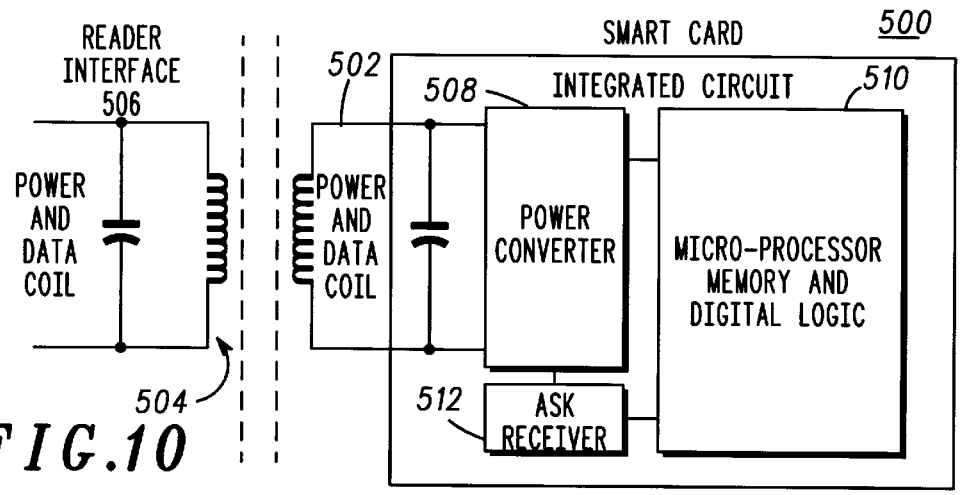
FIG. 10 is a block diagram of a single coil smart card.

FIG. 10 is a block diagram of a single coil smart card 500. The smart card 500 has a coil (antenna) 502 for receiving a radio frequency signal (signal) from a power and data coil 504 of a reader 506. The coil 502 converting the radio frequency signal to an electrical signal (output) that is connected to a power converter 508. The power converter 508 generates a supply voltage (supply voltage signal) that powers a processor 510 and associated circuitry (memory and digital logic) and an amplitude shift keyed receiver 512. The ASK receiver 512 demodulates the radio frequency signal. The processor 510 connected to an output of the ASK receiver 512. To reduce interference with other electronic devices the radio frequency signal is ASK modulated with a modulation index of less than twenty-five percent.

Figure 11:
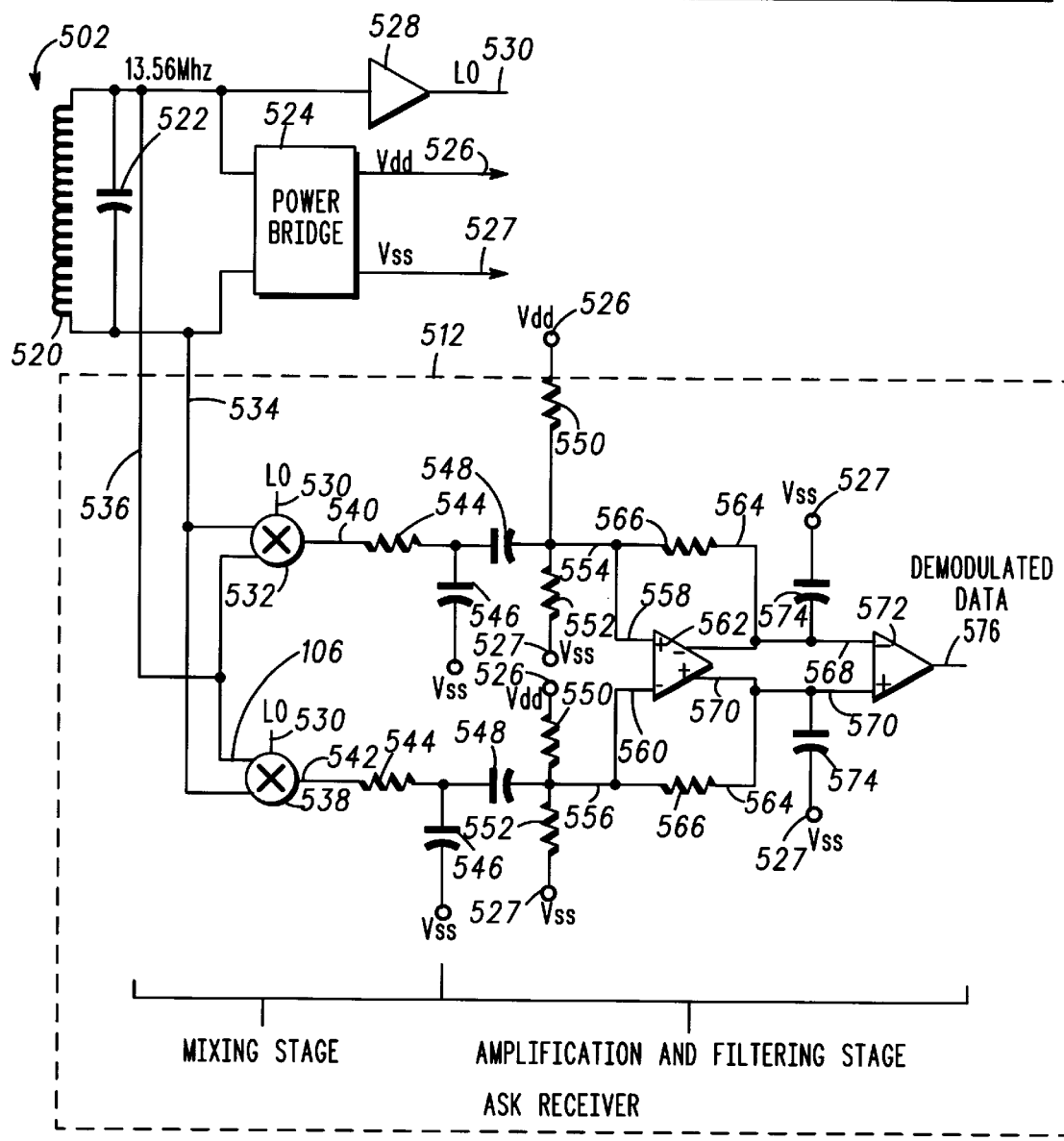
FIG. 11 is a schematic diagram of an ASK receiver used in the single coil smart card of FIG. 10.

FIG. 11 is a schematic diagram of the ASK receiver 512 and power converter 508 of the single coil smart card 500. The coil 502 includes an inductive coil 520 and capacitor 522 connected in parallel. A power bridge 524 conditions and rectifies the received signal to generate a supply voltage 526, 527. The power converter 508 also includes an amplifier 528 that amplifies the received signal and provides isolation. The output 530 of the amplifier is the local oscillator signal 530 used by the ASK receiver 512. The local osciallator signal and the input signal have the same frequency (equal frequency).

The ASK receiver 512 is a balanced differential circuit that is electrical floating. The circuit has a first polarity mixer 532 that mixes a first polarity output 534–536 from the coil 502 with the local oscillator signal 530. A second polarity mixer 538 mixes a second polarity output 536–534 with the local oscillator signal 530. The outputs 540, 542 of the first mixer 532 and the second mixer 538 are coupled to an integrator 544, 546. The integrator 544, 546 integrates the outputs (first polarity signal) and is composed of a series resistor 544 and a parallel capacitor 546. The output (first integrated signal) of the integrator is connected to a blocking capacitor 548. The signal is then added to a bias signal (bias voltage) formed by a voltage divider 550, 552. The outputs 554, 556 of the voltage dividers are coupled to a first input 558 and a second input 560 of an amplification circuit. The amplification circuit has a differential operational amplifier 562 with a pair of feedback circuits (feedback signal) 564 having feedback resistors 566. The output 568, 570 of the amplifier 562 is connected to a single ended operational amplifier 572 and a capacitor 574. The capacitor 574 makes the circuit including the differential operational amplifier 562 unconditional stable. The output (demodulated data signal) 576 of the single ended operational amplifier 572 is coupled to the processor 510. As in the earlier circuits, the operational amplifiers 562, 572 are current starved, saving power and acting as a high frequency filter.

Thus there has been described a quadrant detector circuit that provides the necessary phase alignment for ASK and BPSK signals to be demodulated. The quadrant detector circuit is a simple low power circuit that allows a simple low power receiver circuit. While the invention has been described in conjunction with specific embodiments thereof, it is evident that many alterations, modifications, and variations will be apparent to those skilled in the art in light of the foregoing description. Accordingly, it is intended to embrace all such alterations, modifications, and variations in the appended claims.

What is claimed is:

1. A balance differential receiver circuit, comprising:

quadrant detector means, operably coupled to a pair of inputs, a first of the pair of inputs coupled to an in-phase signal and a second of the pair of inputs coupled to a quadrature phase signal, for detecting a phase relationship between the in-phase signal and the quadrature signal; and quadrant rotation means, having a selection input operably coupled to the quadrant detector means, for switching between a local oscillator signal and an inverse local oscillator signal.

2. The balance differential receiver circuit of claim 1, further comprising a sample counter having an input coupled to an output of the quadrant detector means.

3. The balance differential receiver circuit of claim 1, wherein the quadrant detector means comprises an in-phase differential amplifier and a quadrature phase differential amplifier.

4. The balance differential receiver circuit of claim 3, wherein the in-phase differential amplifier has a first input connected to a first polarity in-phase signal and a second input connected to a second polarity in-phase signal.

5. The balance differential receiver circuit of claim 3, wherein the quadrature phase differential amplifier has a first input connected to a first polarity quadrature signal and a second input connected to a second polarity quadrature phase signal.

6. The balance differential receiver circuit of claim 1, further including an amplifier, the amplifier comprising:

an in-phase differential operational amplifier having a positive input connected to a first polarity in-phase signal and a negative input connected to a second polarity in-phase signal;

a quadrature phase differential operational amplifier having a positive input connected to a first polarity quadrature phase signal and a negative input connected to a second polarity quadrature phase signal;

an in-phase single ended operational amplifier having a positive input connected to a negative output of the in-phase differential operational amplifier and a negative input connected to a positive output of the in-phase differential operational amplifier, the in-phase single ended operational amplifier having an output coupled to the quadrant detector means; and a quadrature phase single ended operational amplifier having a positive input connected to a negative output of the quadrature phase differential operational amplifier and a negative input connected to a positive output of the quadrature phase differential operational amplifier, the quadrature phase single ended operational amplifier having an output coupled to the quadrant detector means.

7. The balance differential receiver circuit of claim 6, further including a resistor between the negative output of the in-phase differential operational amplifier and the negative output of the quadrature phase differential operational amplifier.

8. The balance differential receiver circuit of claim 1, wherein the quadrant detector means comprises an exclusive OR gate.

9. The balance differential receiver circuit of claim 2, wherein the sample counter comprises a D-flip flop.

10. The balance differential receiver circuit of claim 2, wherein the sample counter has an input coupled to the local oscillator signal.

11. A balance differential receiver circuit, comprising:

means for amplifying an in-phase signal and a quadrature phase signal to produce an amplified in-phase signal and an amplified quadrature phase signal;

means for comparing the amplified in-phase signal with the amplified quadrature phase signal, wherein the means for comparing is operative to transmit an indication signal when the amplified in-phase signal and the amplified quadrature phase signal have a common polarity; and rotation means, operably coupled to the indication signal, for selecting between a first local oscillator signal and a second local oscillator signal, wherein the second local oscillator signal is an inverse of the first local oscillator signal.

12. The balance differential receiver circuit of claim 11, wherein the means for comparing comprises an exclusive OR gate having an output coupled to a sample counter.

13. The balance differential receiver circuit of claim 12, wherein the sample counter is operably coupled to the first local oscillator signal.

14. A method of extracting a data signal that includes an in-phase component and a quadrature phase component using a local oscillator signal, the method comprising the steps of:

(a) receiving the in-phase component from an in-phase mixer;

(b) receiving the quadrature phase component from a quadrature phase mixer;

(c) comparing the in-phase component to the quadrature phase component to form an indication signal; and (d) selecting, responsive to the indication signal, between the local oscillator signal and an inverse of the local oscillator signal.

\* \* \* \* \*